UNITED STATES PATENT OFFICE.

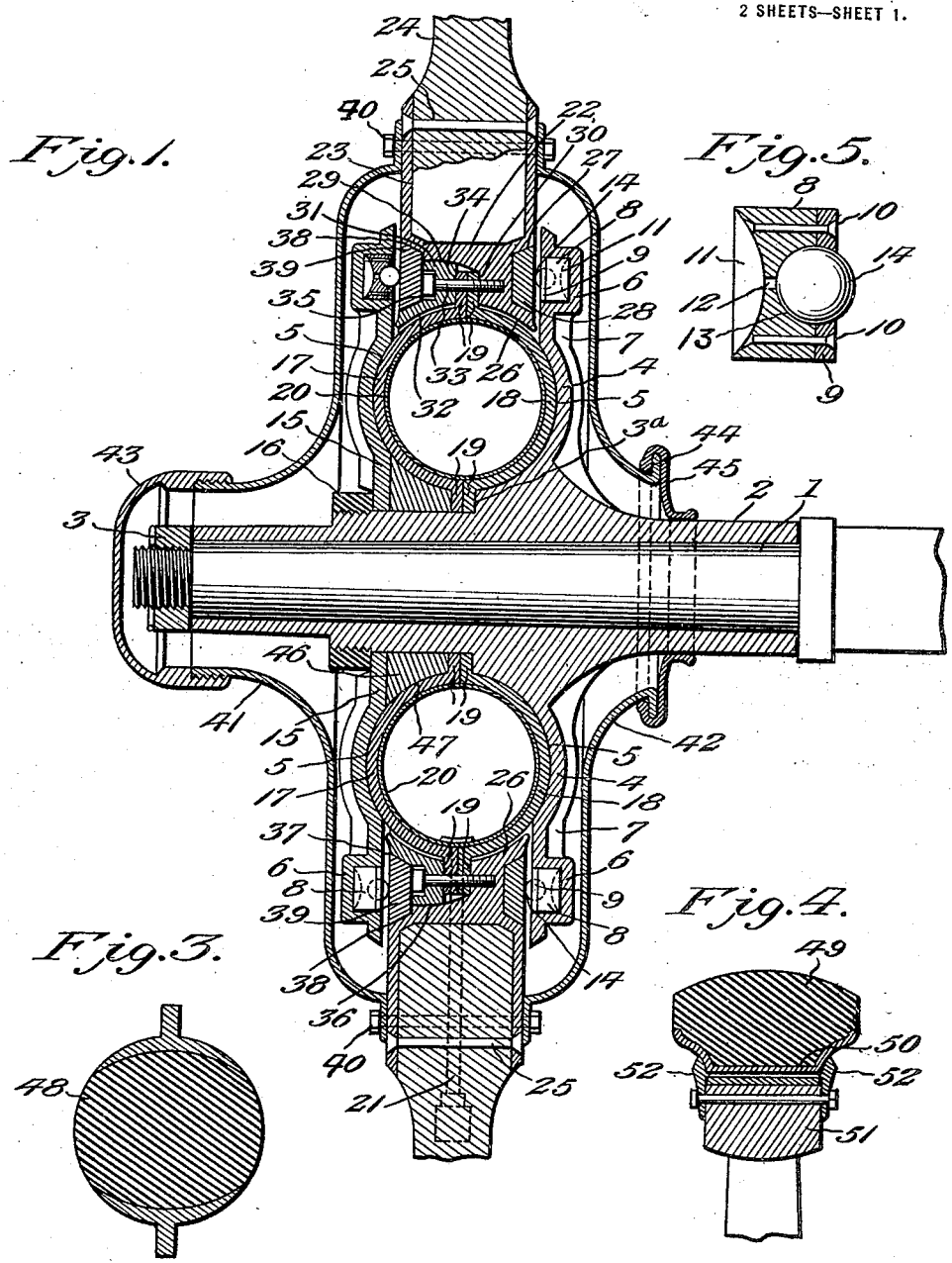

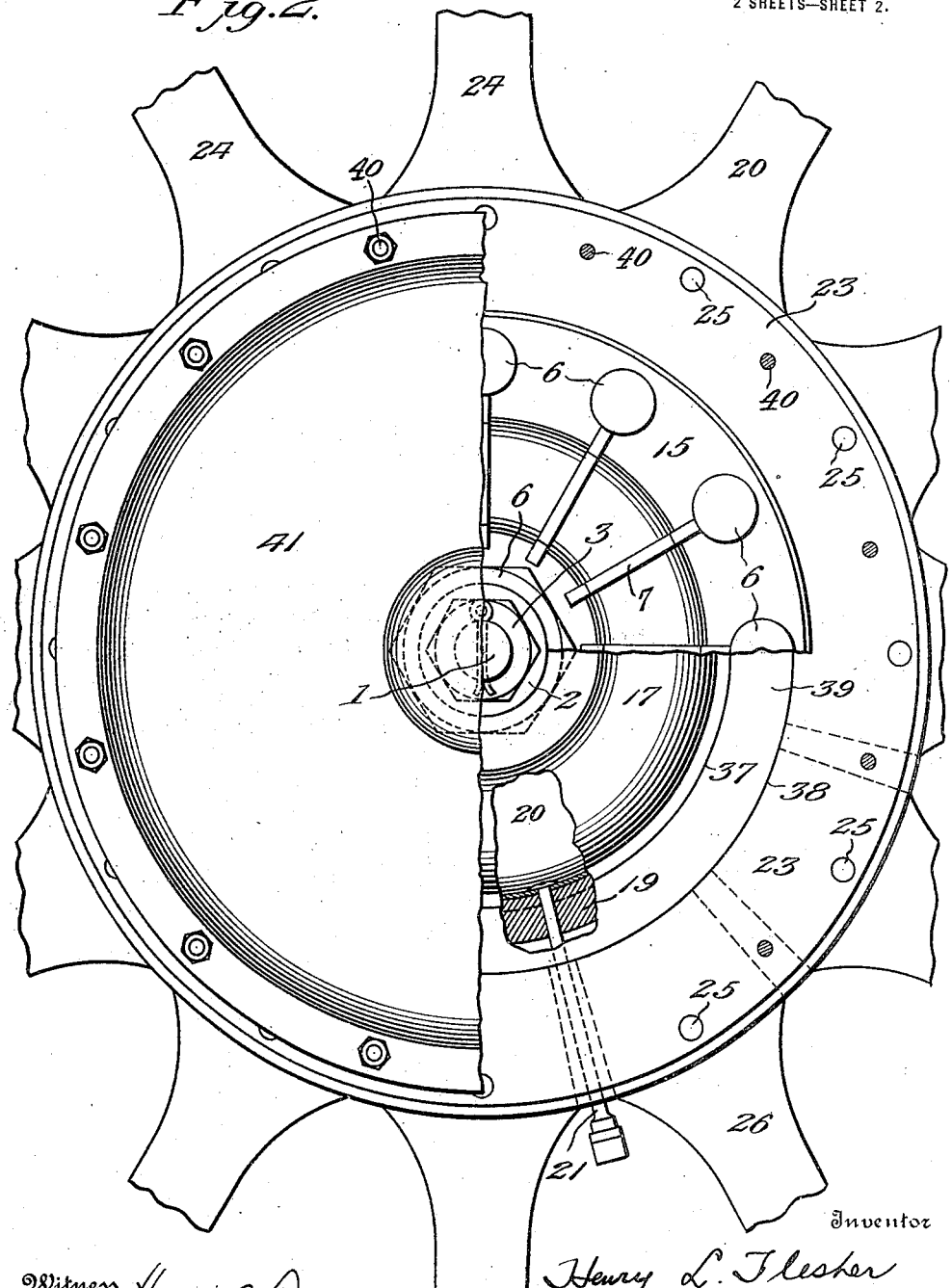

HENRY L. FLESHER, OF RILEY, INDIANA.

PNEUMATIC OR CUSHION VEHICLE WHEEL.

1,417,311.  Specification of Letters Patent.  Patented May 23, 1922.

Application filed May 10, 1917. Serial No. 167,772.

*To all whom it may concern:*

Be it known that I, HENRY L. FLESHER, a citizen of the United States, residing at Riley, county of Vigo, and State of Indiana, have invented certain new and useful Improvements in Pneumatic or Cushion Vehicle Wheels, of which the following is a specification.

This invention relates to pneumatic or cushion vehicle wheels and has for its object the provision of an improved construction at the hub portion of the wheel whereby the pneumatic, or cushion, device is located and held thereat and a solid tire may be employed on the felly of the wheel. If the wheel is used with a truck, a cushion device is preferably used in the region of the hub, but for ordinary vehicles and automobiles, a pneumatic tube will be used.

The present improvements relate to the manner of holding the cushion device at the hub portion of the wheel and the antifriction means employed for minimizing wear, as the hub portion moves to and fro while the wheels is in use.

My improvements also pertain to means for enclosing and protecting the operative parts of the hub construction for the purpose of excluding dust, water, mud, sleet, snow and the like, without interfering with the movement of the parts.

In connection with my invention I may employ an improved tire to be mounted on the felly of the wheel which can be readily placed in position or removed for the substitution of another tire, but the present invention is not limited thereto as any desired tire may be employed, although a cushion tire is preferred.

One embodiment of the invention is set forth hereinafter and shown in the accompanying drawings, but as changes of construction may be resorted to without departing from the essential principles of the invention, the disclosure is to be considered as illustrative, rather than restrictive, of the scope of the invention.

In the accompanying drawings:

Figure 1 is a radial section, spokes being broken away;

Figure 2 a front elevation partly broken away;

Figure 3 a detail cross section of a modified cushion;

Figure 4 is a similar view of a tire which may be used;

Figure 5 a detail sectional view of a ball and its cup.

The axle is shown at 1 and the main hub at 2, the latter being retained by a suitable nut 3. The hub 2 has an annular shoulder 3ª and a dish-like flange 4 which is provided with an annular channel 5 having a curved surface. At intervals the flange 4 is provided with cups 6 which are reinforced, together with the flange, by ribs 7 extending from the body of the hub to said cups. Within the cups are ball cages 8 whose caps 9 are secured to the cages by rivets 10. The bottoms of the cages 8 are hollowed out as at 11 and communicate by a port 12 with the seat 13 for the ball 14. The cavity 11 holds oil which has access to the ball 14 by the port 12. The cage, with its ball, is loosely positioned in the cup 6.

There is slipped over the hub 2 another flange 15 corresponding in all respects to the flange 4 except that it is detachable from the hub. This flange 15 carries ball bearings similar to those previously described. A nut 16 secured on to the hub 2 holds the flange 15 in position.

The cushion device may be the pneumatic tube shown in Fig. 1 or the cushion structure of Fig. 3. The pneumatic construction has a casing or shoe composed of duplicate annular parts 17, 18, each having annular flanges 19. Any suitable inflatable tube 20 is located inside of the casing sections 17, 18, and there is provided any suitable valve device 21 leading to the tube 20 whereby the latter may be inflated. The annular grooves 5 in the flanges 4, 15, receive and bear against the sides of the parts 17, 18 of the casing. The inner flanges of those shown at 19 encircle the hub 2 and rest against the shoulder 3ª.

An annular outer rim 22 having sockets 23 for the spokes 24, the latter being connected thereto by rivets or bolts 25, has an annular grooved portion 26 adapted to bear on the casing 18 and is provided with an annular channel 27 in which is seated a case-hardened wear plate or ring 28 against which the balls 14 carried by the flange 4, bear. The width of the plate 28 is such that the balls 14 will always be in contact therewith regardlesss of the compression of the cushion device, The ring 28 need not be fastened in position, but may be retained solely by the lateral pressure thereon. Preferably, it is kept relatively tight by having its walls and those of the channel 27 sloping or tapered.

The other side of the rim 22 has a hollowed out portion or annular groove 29 and a shoulder 30 against which the outer flange 19 of the casing section 18 abuts.

An annular clamping ring 31 which is grooved or curved at 32 where it bears on the casing section 17, is detachably connected to the rim by bolts 33 which also pass through holes in the flanges 19 and are screwed into the rim 22. The ring 31 clamps against the flanges 19 and thus the latter are firmly held between the ring 31 and the rim 22. The heads of the bolts are located in concavities 35.

There is sufficient clearance 36 to permit suitable compression of the cushion device 17, 18, 20, to permit the wheel to have the requisite resiliency.

The clamping ring 31 is provided with an annular rabbet or channel 37 having a sloping face, and the rim 22 also has a rabbet or channel 38. The two channels accommodate a wear ring 39 similar in all respects to the ring 28. The balls 14 carried by the flange 15 bear on the ring 39.

Secured to the socket portions 23 by removable bolts 40 are the sections 41, 42 of the housing or shell. A cap 43 which is detachably connected to the section 41 may be taken off to afford access to the nut 3. The section 42 is provided with a flange 44 with which is engaged an elastic dust proof washer 45 which bears on the hub 2 so that water, snow, mud, dust and other foreign elements are prevented from having access to the space within the shell.

A collar 46 which surrounds the hub 2, bears on the flange 19 of the section 17 and also against the flange 15, said collar being provided with an annular channel 47 which bears against the casing 17.

In Fig. 3 I have shown a cushion 48 which may be substituted for the pneumatic cushion heretofore described, especially where the wheel is used on trucks and less resiliency is necessary. The center of the cushion may be of solid rubber and the upper and lower parts of fabric or fabric combined with rubber.

Any tire may be used, but I prefer to employ the one shown in Fig. 4. The tire 49 which is of solid rubber is vulcanized to or formed on a metal rim 50 which is self-contained therewith and can be slipped on to the felly 51 and held by any suitable clamps or flanges 52. With this form of tire, the user can exchange a worn tire for a corresponding tire, without having to pay for a new rim.

Having thus described my invention, what I claim as new and desire to secure by Letters Patent is:—

1. A vehicle wheel comprising a hub, a flange rigidly secured to the hub, a removable flange on the hub, a rim disposed between said flanges, antifriction bearings interposed between the rim and the flanges, a cushioning member located between and bearing against the flanges, hub, and rim, and a nut screwed onto the hub, said nut bearing on the removable flange and through said flange holding all of the aforesaid parts in position without other fastening means being required therefor, the cushioning member being provided with projecting means, said means being clamped between the flanges.

2. A vehicle wheel comprising a hub, a rim, flanges carried by the hub and having lubricating cups, ball cages slidably mounted in said cups, balls carried by, and unitary with, said cages and bearing on said rim, and means for securing said flanges on said hub, said balls and their cages being insertable within, or removable from, the cups as self-contained units, and a cushioning member located between the flanges, hub, and rim.

3. A vehicle wheel comprising a hub, a flange secured to the hub, another flange adjustable on the hub, a rim located between the flanges, said rim having on one side an annular hollowed part provided with a shoulder, a cushioning device interposed between the flanges, the rim, and the hub and bearing against said shoulder on the rim, an annular clamping ring located within the hollowed part aforesaid, said clamping ring having a concaved annular part bearing on the cushioning device and a flat part secured to the shoulder on the rim and holding the cushioning device against said shoulder, there being provided an annular groove, a portion of which is provided in the outer face of the clamping ring and the remainder in the rim, a detachable wear plate seated in the groove thus provided, an annular wear plate at the opposite side of the rim, and antifriction bearings carried by the flanges and bearing on the wear plates, and means for holding the adjustable flange on the hub.

In testimony whereof, I hereunto affix my signature:

HENRY L. FLESHER.